(12) United States Patent
Kerr et al.

(10) Patent No.: US 11,722,299 B1
(45) Date of Patent: Aug. 8, 2023

(54) SPATIALLY-BOUND CRYPTOGRAPHIC STORAGE

(71) Applicant: Perspecta Labs Inc., Basking Ridge, NJ (US)

(72) Inventors: Daniel R. Kerr, Basking Ridge, NJ (US); Omer Akgul, Basking Ridge, NJ (US)

( * ) Notice: Subject to any disclaimer, the term of this patent is extended or adjusted under 35 U.S.C. 154(b) by 245 days.

(21) Appl. No.: 17/155,979

(22) Filed: Jan. 22, 2021

Related U.S. Application Data

(60) Provisional application No. 62/964,337, filed on Jan. 22, 2020.

(51) Int. Cl.
*H04L 9/08* (2006.01)
*H04L 9/32* (2006.01)
*H04W 4/02* (2018.01)

(52) U.S. Cl.
CPC .......... *H04L 9/0894* (2013.01); *H04L 9/0891* (2013.01); *H04L 9/3215* (2013.01); *H04W 4/023* (2013.01); *H04L 2209/80* (2013.01)

(58) Field of Classification Search
CPC ... H04L 9/0894; H04L 9/0891; H04L 9/3215; H04W 4/023

USPC .......................................................... 380/277
See application file for complete search history.

(56) References Cited

U.S. PATENT DOCUMENTS

| | | | |
|---|---|---|---|
| 10,895,994 B2 * | 1/2021 | Abe .................... | G06F 16/1727 |
| 2020/0169383 A1 * | 5/2020 | Durham .................... | H04L 9/14 |
| 2020/0275245 A1 * | 8/2020 | Haubner ............... | H04W 88/04 |
| 2021/0117340 A1 * | 4/2021 | Trikalinou ............ | G06F 9/5083 |
| 2021/0374234 A1 * | 12/2021 | Bursell ............... | G06F 21/6218 |

* cited by examiner

*Primary Examiner* — Kambiz Zand
*Assistant Examiner* — Phuc Pham
(74) *Attorney, Agent, or Firm* — Heslin Rothenberg Farley & Mesiti PC

(57) ABSTRACT

Embodiments of the present invention include a computer program product, a computer-implemented method, and a system, where program code executing on one or more processors (on a client) obtains, from a host within a secure environment, data stored on the host. To obtain the data, the processor(s) establishes a communications connection to a computing resource in the secure environment and authenticates to the computing resource to obtain a key. The processor(s) intercepts the data, encrypts the data, with the key, and stores the encrypted data on a buffer accessible to the client.

16 Claims, 6 Drawing Sheets

SPATIALLY-BOUND CRYPTOGRAPHIC STORAGE

CROSS REFERENCE TO RELATED APPLICATIONS

This application claims priority from U.S. provisional patent application No. 62/964,337, filed Jan. 22, 2020, entitled, "SPATIALLY-BOUND CRYPTOGRAPHIC STORAGE," which is hereby incorporated herein by reference in its entirety for all purposes.

BACKGROUND OF INVENTION

Sensitive digital information leakage from trusted offline labs is an issue that can stem from employee carelessness, adversarial efforts, etc. One way in which this information is leaked from a trusted location is through portable storage devices (e.g., thumb drives, hard drives, solid state drives) being taken outside of the trusted offline labs. The ability to move secure data from a secure location off-site, so easily, increases the likelihood of classified information being leaked significantly.

SUMMARY OF INVENTION

Shortcomings of the prior art are also overcome and additional advantages are provided through the provision of a method for securing sensitive data outside of a secure environment. The method includes: obtaining, by one or more processors of a client, from a host within a secure environment, data stored on the host, wherein the obtaining comprises: establishing, by one or more processors, a communications connection to a computing resource in the secure environment; based on establishing the connection, authenticating, by the one or more processors, to the computing resource, wherein the authenticating comprises obtaining a key; intercepting, by the one or more processors, the data; encrypting, by the one or more processors, the data, with the key; and storing, by the one or more processors, the encrypted data on a buffer accessible to the client.

Shortcomings of the prior art are also overcome and additional advantages are provided through the provision of a system for securing sensitive data outside of a secure environment. The system includes: a memory; one or more processors in communication with the memory; program instructions executable by the one or more processors via the memory to perform a method, the method comprising: obtaining, by the one or more processors, wherein a client comprises the one or more processors, from a host within a secure environment, data stored on the host, wherein the obtaining comprises: establishing, by one or more processors, a communications connection to a computing resource in the secure environment; based on establishing the connection, authenticating, by the one or more processors, to the computing resource, wherein the authenticating comprises obtaining a key; intercepting, by the one or more processors, the data; encrypting, by the one or more processors, the data, with the key; and storing, by the one or more processors, the encrypted data on a buffer accessible to the client.

Shortcomings of the prior art are also overcome and additional advantages are provided through the provision of a computer program product for securing sensitive data outside of a secure environment. The computer program product includes a computer readable storage medium readable by one or more processors and storing instructions for execution by the one or more processors for performing a method comprising: obtaining, by the one or more processors, wherein a client comprises the one or more processors, from a host within a secure environment, data stored on the host, wherein the obtaining comprises: establishing, by one or more processors, a communications connection to a computing resource in the secure environment; based on establishing the connection, authenticating, by the one or more processors, to the computing resource, wherein the authenticating comprises obtaining a key; intercepting, by the one or more processors, the data; encrypting, by the one or more processors, the data, with the key; and storing, by the one or more processors, the encrypted data on a buffer accessible to the client.

Systems, computer program products, and computer-implemented methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
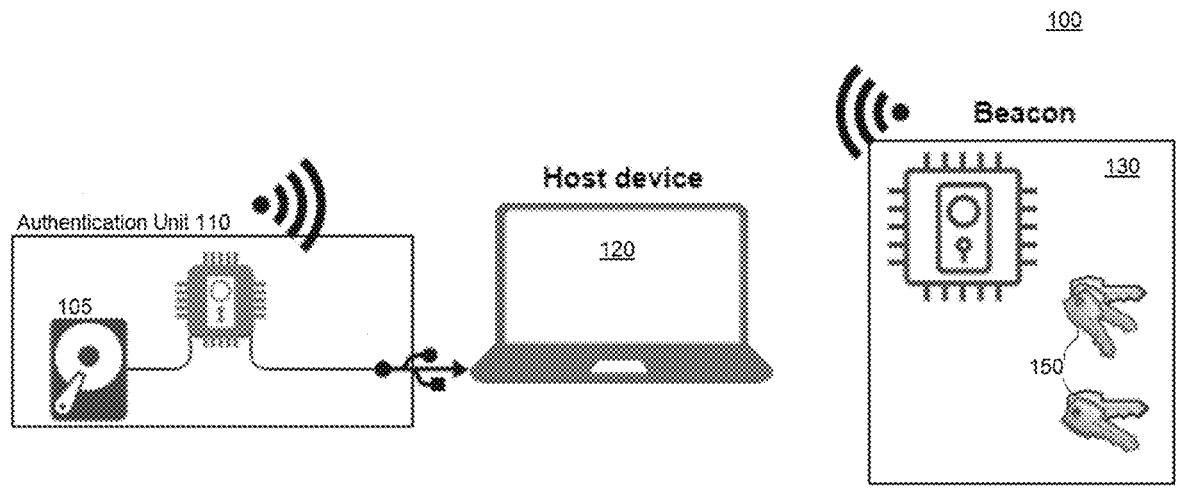
FIG. 1 depicts a technical environment into which aspects of some embodiments of the present invention have been implemented.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, a GPP, an FPGA and a GPU (graphics professor unit). Additionally, items denoted as processors may include hardware and/or software processors or other processing means, including but not limited to a software defined radio and/or custom hardware.

Embodiments of the present invention include providing a storage mechanism that provides regular input/output (TO) functionality while inside of a secure parameter, but is cryptographically locked while outside of the secure parameter. To provide this storage mechanism, embodiments of the present invention utilize multi-party computation policy and one or more environmental beacon to: 1) intercept storage protocol reads/writes; 2) execute a cryptographic handshake on each operation with the one or more authenticating beacons in the environment; and 3) only allow data to be read or written if the multiparty policy is met.

Embodiments of the present invention are inextricably linked to computing at least because they provide a solution to provide that is routed in computing utilizing a combination of hardware and/or software. Embodiments of the present invention can be utilized in certain environments have sensitivities that require the tight control of the data and activity performed within that environment, where the burden of security and control extends beyond the individual. Aspects of various embodiments of the present invention prevent opportunities for negligence and intentional theft of data from a secure computing environment that can lead to leaking and/or steal the sensitive data from the environment. Examples of environments in which aspects of some embodiments of the present invention can be implemented to secure data include, but are not limited to, classified working environments, corporate advanced research, medical environments where Health Insurance Portability and Accountability Act (HIPAA) compliance is important, and/or human resources (HR) departments using personally identifiable information (PII). The individuals working in these environments are exposed to highly-sensitive data while and aspects of the present invention secure the data in a manner that removes reliance of these individuals to protect the data. These specific needs and uses for embodiments of the present invention also speak to the practicality of the solution; it is a practical application of various aspects that provides these security measures. Embodiments of the present invention represent improvements over existing data security approaches (thus providing significantly more than these existing approaches) because although these current approaches use a combination of authentication and authorization in combination with cryptography to secure the information on centralized storage, local storage (CD/DVD, flash drive, printed copies, etc.) is be difficult to monitor in these environments and is often times allowed as a necessity for normal business operations. These existing approached often times do not prevent the unauthorized duplication of materials after an allowed transfer. Thus, this unsecured local storage represents a security risk that is addressed in embodiments of the present invention.

Embodiments of the present invention, unlike existing approaches to data security, secure data accessed within a secure space even if it is removed from the secure space. To enable this functionality, embodiments of the present invention include a stationary beacon in the secure (defined) space (e.g., a trusted laboratory). In some embodiments of the present invention, the beacon can be either static or dynamic. Storage devices utilized within the secure space comprise authentication modules. Program code comprising the authentication modules has access to the read/write buffers, which are encrypted or decrypted depending on the read or write. The beacon stores the encryption keys. In embodiments of the present invention, the storage devices are spatially bound, based on the location of the beacon in the space, because each authentication module authenticates with the beacon to acquire the key(s). In some embodiments of the present invention, the authentication of the storage devices with the beacon, to acquire the key that enables the storage devices to access the buffers, is automatic and accomplished, within the space, without any user interaction. In other embodiments of the present invention, the key is requested by a user based on entry into an input/output (IO) device, including, but not limited to, through a graphical user interface (GUI). Embodiments of the present invention represent an improvement over current approaches to preventing data leakage from secure environments that includes utilizing strong cryptographic storage media which encrypts data, but relies on an authorized user to decrypt and use it. These current approaches to strong cryptographic media include passwords, or biometrics for access authorization. Unlike embodiments of the present invention, these existing approaches do not have any notion of multiple parties or spatial bounds. In contrast, embodiments of the present invention provide multi-party protection and (automatically) spatially bound accessibility to secure data through a unique approach that does not require any specific software, driver, or modification to a user's client machine. Embodiments of the present invention can be used with multiple storage protocols (e.g., USB, SCSI, My, iSCSI, etc.), and multiple beaconing protocols (e.g., 802.11, ZigBee, Bluetooth, etc.). Embodiments of the present invention effectively add a second factor of authorization or authentication by bounding a spatial signal to an existing authentication and authorization process that is being employed. More complex MPC policies can also be employed with aspects of embodiments of the present invention to enable complex situations, including but not limited to, limiting access to data at a given location to users within a given permission group to times when a given authorized individual is also present (e.g., only allowing developer access when inside of building X, and the team lead is present).

Figure 2:
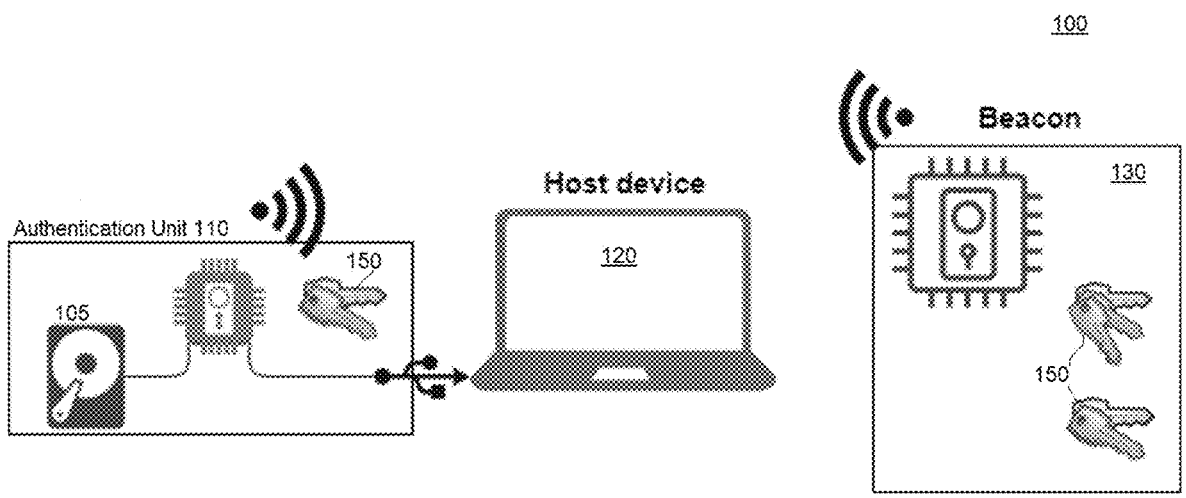
FIG. 2 depicts the technical environment of FIG. 1 into which aspects of some embodiments of the present invention have been implemented.
Figure 3:
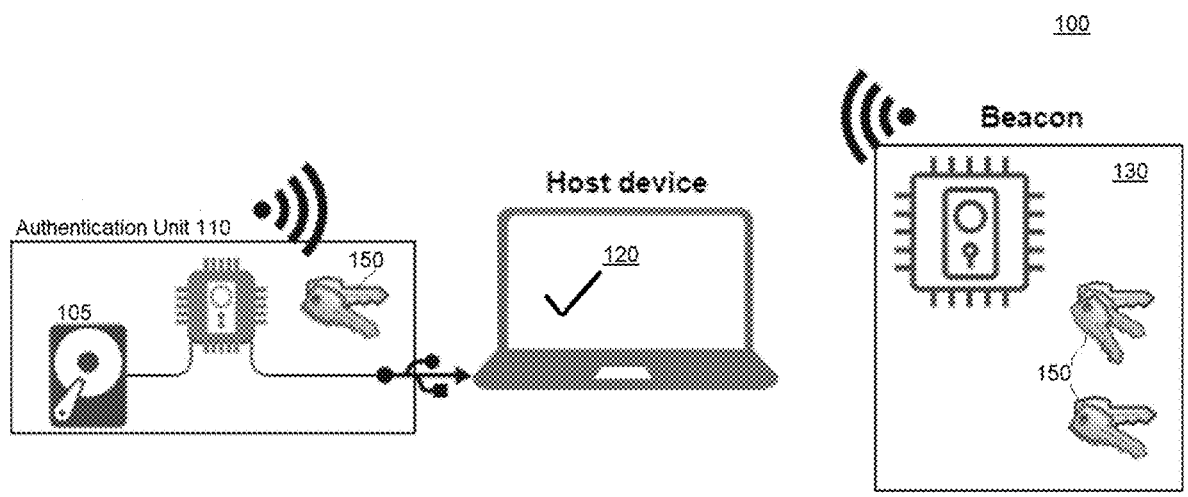
FIG. 3 depicts the technical environment of FIG. 1 into which aspects of some embodiments of the present invention have been implemented.

FIGS. 1-3 illustrate aspects of a technical environment 100 into which various aspects of some embodiments of the present invention have been implemented. Each of FIGS. 1-3 illustrates the technical environment 100 at different points in the spatially bound authentication process of embodiments of the present invention. The process is illustrated sequentially, starting with FIG. 1, moving to FIG. 2, and then, to FIG. 3. Included in the technical environment 100 is a portable storage device 105, a host device 120, an authentication device 110, and a beacon 130. The authentication unit 110 can comprise hardware and/or software. The authentication unit 110 is this example includes a storage device 105, which can be understood as a buffer. The authentication unit 110 executes program code that enables it to authenticate to the beacon 130 and access the storage device 105. The beacon 130 is stationary and can only be communicated with, by another computing device, such as the host device 120, within a spatially defined area. In order to access the host device 120 for the purposes of saving data on the storage device 105, the authentication unit 110 authenticates to the beacon 130 to obtain a key 150. In embodiments of the present invention, the beacon 130 stores keys 150. The authentication unit 110 utilizes the key 150 it obtains from the beacon 130 to access data on the host device 120 and store it on the storage device 105. Data stored in the storage device 105 is encrypted with the key 150. Without the key 150, the data on the host device 120 cannot be stored on the storage device 105. Also, data previously stored on the storage device 105 cannot be accessed without a connection between the beacon 130 and the authentication unit 110. If the authentication unit 110 cannot communicate with the beacon 130, the data, which originated from the host device 120, is not accessible (because it cannot be encrypted and/or decrypted). Thus, embodiments of the present invention provide the convenience of portable storage devices, such as the storage device 105, while eliminating the risk of sensitive information leakage. In some implementation of the present invention, hardware (the beacon 130) is installed in the secure environment (e.g., trusted lab), but existing hardware and software systems that interface with portable storage (computers, lab equipment etc.) are not modified. Some embodiments of the present invention utilize modified portable storage devices, such as the authentication unit 110, which includes the storage device 105.

In some embodiments of the present invention, each portable storage device, such storage device 105, is sector addressable (e.g., almost all flash storage devices) and is equipped with an authentication unit 110 that has networking and cryptographic capabilities. The authentication unit 110 has access to a read write buffer of the storage device 105. The beacon 130, which is also capable of cryptographic operations, is placed in the trusted lab (i.e., a designated geographic area, room, office, indoor space, outdoor space, etc.). In some embodiments of the present invention, each sector that is to be read/written is first passed through the authentication unit 110. The authentication unit 110 encrypts/decrypts data passed through it (e.g., from the host device 120) with keys 150 obtained from the beacon 110. In some embodiments of the present invention, these encryption keys 150 are kept in volatile storage on the authentication unit 110 and are deleted in the case of power loss (e.g., removing the storage unit from the host device 120) or if the authentication could not be repeated within a certain period.

Thus, as illustrated in FIGS. 1-3, in embodiments of the present invention everything that is written to storage (e.g., on the storage device 105), which originated from clients within the environment, including but not limited to, the host device 120, is encrypted and cannot be decrypted properly unless the authentication unit 110 can communicate with the beacon 130. In various embodiments of the present invention, this technical architecture 100 is not interface protocol (e.g., USB, SATA, PCI(e)) dependent. The authentication unit 110 accesses the physical read write buffer, but can be indifferent toward communication interface(s) of the storage device 105.

In embodiments of the present invention, the encryption of the data can be accomplished on either the beacon 130 or on the authentication unit 110. The example of FIGS. 1-3 depict handling the encryption at the authentication unit 110. In embodiments of the present invention that handle encryption tasks at the beacon 130, the data in the sector to be encrypted/decrypted is sent over to the beacon 130. The beacon 130 (e.g., program code executed by the beacon) encrypts the data with the appropriate keys 150 and sends the data back, to be stored on the storage device 105. Unlike in the illustrated example of FIGS. 1-3, encrypting at the beacon 130 ensures that the keys 150 never leave the beacon and are therefore less likely to be compromised. Thus, the authentication unit 110 can have a simpler design because it will not handle encryption/decryption. However, in certain instances, this approach could potentially create networking overhead that could negatively impact the speed of the encryption/decryption process. In these examples, caching could be utilized to handle potential performance issues. However, caching could add a layer of complexity given that if utilized, it could potentially introduce a new hardware and/or could limit the storage of the existing storage devices. In embodiments of the present invention where the beacon 130 is fixed and encryption tasks are handled at the beacon 130, the implementation of an embodiment of the present invention can also include complex access control mechanisms because the encryption/decryption is centralized. Thus, in some embodiments of the present invention where the beacon 130 handles the encryption and decryption, the beacon 130 can also provide one or more of the following controls: revoking keys, using multiple keys on one storage device for different levels of access, and/or analyzing data and keeping it in plain-text. The beacon 130 can also set and manage key expiration policies, in some embodiments of the present invention.

In some embodiments of the present invention, as illustrated in FIGS. 1-3, encryption tasks are handled at the authentication unit 110. As advantage of this approach is that encryption tasks can be performed faster as encryption routines can be implemented directly on hardware with no communication overhead. In embodiments of the present invention that utilize this approach, the beacon 130 sends relevant keys 150 to the authentication unit 110, and then to the storage device, which can create security concerns, including but not limited to: 1) malware installed on the storage device can store the keys and this can be recovered outside of the trusted environment; and/or 2) a maliciously crafted storage device might talk the authentication protocol and steal keys. In order to address these concerns, in some embodiments of the present invention, the authentication unit 110 is implemented as a module at a hardware level and recommend private keys (e.g., stored in trusted hardware) are added to each storage unit (e.g., storage device 105) to be used in authentication.

As discussed above, unlike certain removable secure storage approaches, embodiments of the present invention provide flexibility in regards to the technologies that can be utilized to implement this aspects of the present invention. For example, embodiments of the present invention can utilize a variety of different storage protocols, including but not limited to, USB (1.0, 2.0, 3.0), PCIe, SCSI, iSCSI, and/or PIV. The interfaces utilized in embodiments for spatially bounding include, but are not limited to, 802.11 (WiFi), Bluetooth, ZigBee, NFC, and/or RF. The authentication module can be implemented on an existing computing client, as a system on a chip (SoC), and/or as proprietary hardware, such as a field-programmable gate array (FPGA).

Figure 4:
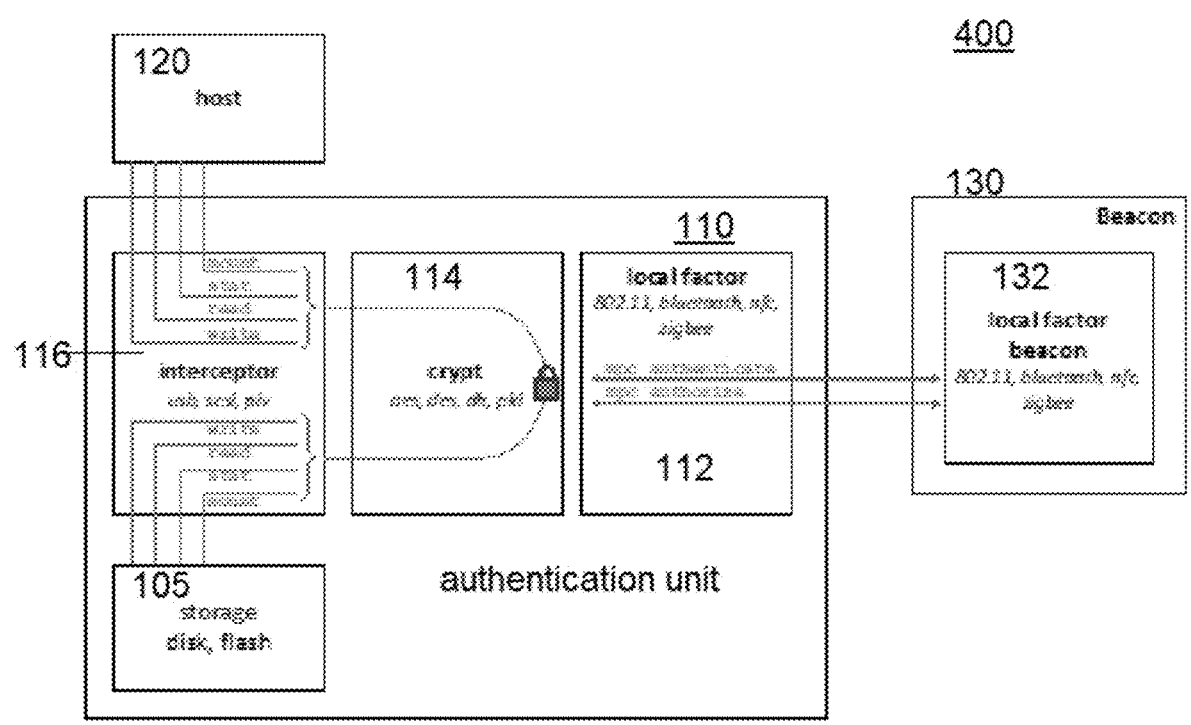
FIG. 4 depicts certain aspects of the technical environment of FIG. 1 in more detail.

FIG. 4 provides a more detailed illustration 400 of certain aspects of some embodiments of the present invention. Just as illustrated in FIGS. 1-3. FIG. 4 includes the communication interface 112 of the authentication unit 110, which communicates with the communication interface 132 of the beacon 103, such that the beacon 130 can authenticate the authentication unit 110. Some non-limiting examples of possible interfaces utilized are noted in the figure (e.g., 802.11, Bluetooth, NFC, and/or Zigbee) and discussed above. Upon authentication, the beacon 130 can then encrypt and decrypt data in the storage device 105, which is accessed on the host device 120. When the data is accessed on the host device 120 (e.g., a disk, a flash drive, etc.), program code executing on the authentication unit 110 intercepts 116 the data (e.g., intercepts normal storage protocol reads/writes) in order to apply the encryption 114, (e.g., executes a cryptographic handshake on each operation), via the key (not pictured) obtained by the authentication unit 110, from the beacon 130. Thus, as illustrated in FIG. 4, the storage device 105 serves all normal I/O functionality while inside of the secure parameter, but is cryptographically locked while outside of the secure parameter.

Discussed below is one, non-limiting example, of specific technologies utilized to implement aspects of one embodiment of the present invention. For ease of understanding, references are made to elements of FIGS. 1-4 in order to illustrate the functionality discussed. In this example, a USB mass storage protocol is utilized (a protocol utilized by USB thumb drives). In this example, the authentication unit 110 is a software implementation such that there is not a separate authentication module. The authentication unit 110 is a modified Linux kernel module and two user programs. A simple computing device, in this example, a raspberry pi, is utilized as a storage device 105 and another is utilized as a beacon 130. The storage device 105 is configured to act as a USB mass storage devices with the authentication module software running on it and the beacon is configured to authenticate and manage keys 150 with a program. The RFCOMM protocol on Bluetooth 4.1 is utilized for networking between the authentication unit 110 and the beacon 130, as there is widespread support for this protocol on existing Linux Bluetooth libraries.

The storage device 105 in this non-limiting example is emulated using a USB mass storage gadget function in the Linux kernel. The raspberry pi zero (w) is utilized in this example because of its capability to utilize this function. A computer utilizes USB-OTG in order to use the USB gadget functions, which is a characteristic of the raspberry pi zero (w). In this example implementation, program code on the beacon 130 and the storage device 105 authenticate between the beacon 130 and the authentication module 112. Public, private and symmetric key generation/management is done using libsodium for C. In this example, encryption operations are done in Kernel mode for performance reasons. An AES-128 implementation from the Linux kernel crypto API is used for this purpose. The AES-128 cipher is used in an example implementation of XTS-AES mode of encryption technique recommended by NIST for sector addressable disk encryption. Communication between the kernel mode USB mass storage driver and the authentication program are done via the /proc filesystem and NETLINK sockets. The /proc filesystem does not have callbacks for user mode programs so the program code periodically polls file changes. Thus, the NETLINK solution can be utilized.

Figure 5:
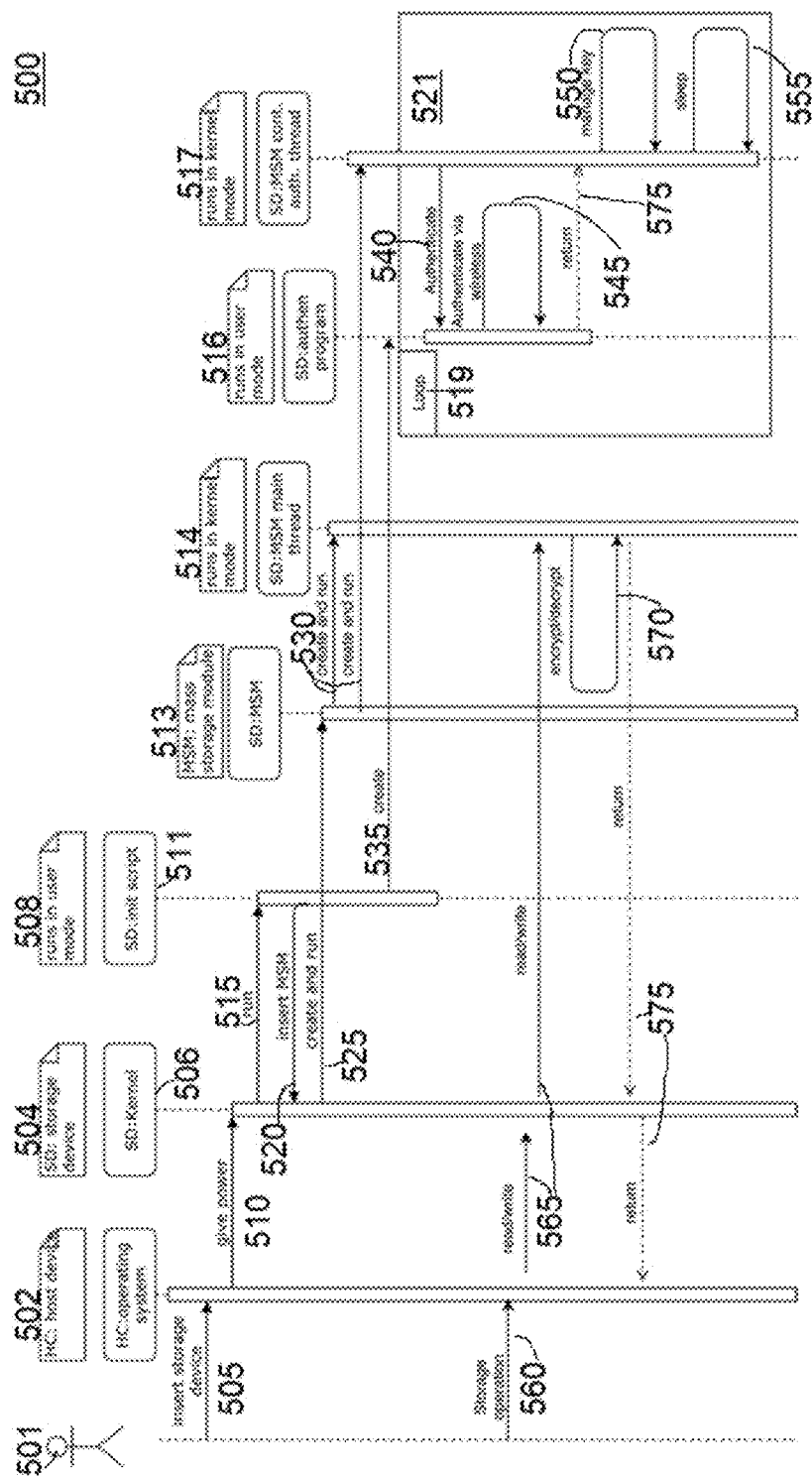
FIG. 5 is a workflow that illustrates various aspects of the learning engine functionality in some embodiments of the present invention.

FIG. 5 illustrates a workflow 500 of various embodiments of the present invention. This workflow 500 is relevant to many embodiments of the present invention, including but not limited to the detailed example discussed above. FIG. 5 illustrates aspects of some embodiments of the present invention from the perspective of the storage device (e.g., FIGS. 1-4, 105). As illustrated in FIG. 5, the storage device is connected to power to initiate the workflow 500. FIG. 5 illustrates the relation of the different threads/processes interacting with each other when the system operates nominally (i.e., no authentication failures or attacks).

Referring to FIG. 5, a user 501 inserts (505) a storage device 504 into a host device 502, where the host device 502 serves as a power source (510) for the storage device 504. The storage device 504 handles encryption operations with a kernel 506. The kernel 506 runs (515) and based on running in user mode 508 and the storage device 504 executing an initialization script 511, the storage a mass storage module (MSM) 513 is inserted (520) on the storage device 504 and created and run on the storage device 504, such that the main MSM thread, running in kernel mode 514 (of the storage device 504), can access an authorization program, running in user mode 516, and an MSM continued authorization thread, running in kernel mode 517 (via create and run 530 or create 535). These processes contact a beacon 521, in order to obtain a key. These accesses can provide authorizations via authentication, in a loop 519. The authorization program 516 and/or thread 517 can authenticate (540), authenticate via wireless (545) and hence, the MSM continued authorization thread, running in kernel mode 517 manages the key (550) and/or sleeps (555). When a key is obtained (authentication is successful), a storage operation can be performed (560), including a read/write (565) to the storage device 504. As discussed below, the data is encrypted/decrypted by the key (570). Depending upon the embodiment, the key can be returned (575) to the storage device 504 and/or the beacon 521.

In some embodiments of the present invention, the functionality of the authentication unit 110 can be extended to support different control schemes. In the illustrated examples, control scheme includes a beacon 130 that is fixed and a storage device 105 that is portable. Some embodiments of the present invention can utilize more than one beacon and in these embodiments, secret sharing, including but not limited to, Shamir secret sharing, can be utilized. Additional security can be added so that data cannot be accessed unless a given number (m) out of all (n) authenticating beacons are present. This embodiments enables decentralization of the encryption keys that are located in one beacon in the examples illustrated in FIGS. 1-4. By adding additional beacons to a technical environment, a compromised beacon might not be able to compromise the secrecy of the data on the storage devices.

In some embodiments of the present invention, program code executing in the technical environment into which the described aspects are implemented prevents certain types of software to be run without the physical presence of authorities. The execution of certain binaries can trigger cyberattacks on a target, thus, if the binaries are stored on storage devices (e.g., storage device 105) equipped with the authentication unit (e.g., authentication unit 110), it would not be possible to run the binaries without the permission of the authorities (the program code).

Aspects of various embodiments of the present invention can be utilized with attribute based encryption, including working with PCIs and/or SATA storage devices, utilizing a portable beacon. In some embodiments of the present invention the authentication unit 110 is implemented to work with PCIe and/or SATA storage devices and the beacon is portable. Ubiquitous two factor authentication can be implemented on any personal computer, regardless of the software systems that the computer runs on. Thus, the main disk of the computer can be swapped out to a drive that has the authentication unit 110 on it. With this implementation, the computer cannot boot unless the main disk can authenticate with the portable beacon (e.g., beacon 130). If the beacon 130 is not portable, the computing can be limited to being accomplished within the trusted labs (delineated spaces) and nowhere else.

In some embodiments of the present invention range extenders can be used to increase the distance between the beacon 130 and storage devices (e.g., storage device 105). In this technical architecture, time of flight measurement solutions can be deployed. This deployment can be utilized in certain embodiments of the present invention to relax the wireless signal isolation constraints of labs (secure spaces) in the technical environment in which aspects of the present invention are deployed.

Some embodiments of the present invention utilize a trusted hardware to enforce geographical restrictions on storage devices. The storage devices (e.g., storage device 105) would can self-authenticate the encryption keys 150 can be kept on the storage devices. This hardware implementation: 1) checks location using GPS; 2) if the check reveals the device is within the predetermined boundaries, decrypt/encrypt using the key is enabled, if not, within boundaries, the key not work. As a countermeasure to GPS spoofing, the program code obtains access to the GPS M-Code and/or any other positioning systems that provides signal authentication services.

A second non-limiting example of an implementation of aspects of some embodiments of the present invention is as a FPGA. A FPGA-based embodiment can utilize an existing storage device and read/write buffers. A verilog/VHDL can be written on the FPGA to implement the encryption decryption operations on these buffers. In some examples of this embodiment, SoC can be utilized for authentication communications. Alternatively, the SoC can be replaced with more FPGA code. A personal computer can serve as a beacon and certain functionality can be implemented with software, including but not limited to communication library integration, cryptographic key management implementations, and error handling.

Embodiments of the present invention include computer-implemented methods, computer program products, and computing systems, which executed a method that includes program code executing on one or more processors of a client obtaining from a host within a secure environment, data stored on the host. In some embodiments of the present invention, the program code obtaining the data includes: the program code establishing a communications connection to a computing resource in the secure environment, based on establishing the connection, authenticating to the computing resource, where the authenticating comprises obtaining a key, intercepting the data, encrypting the data, with the key, and storing the encrypted data on a buffer accessible to the client.

In some embodiments of the present invention, the communications connection is terminated by the client or by the computing resource after the authenticating. In some embodiments of the present invention, the computing node is selected from the group consisting of: a static computing node and a dynamic computing node.

In some embodiments of the present invention, the method also includes the program code accessing the encrypted data on the buffer. The program code accesses the encrypted data by re-establishing the communications connection to the computing resource in the secure environment. Based on re-establishing the connection, the program code authenticates to the computing resource; the authenticating includes obtaining a new key. The program code intercepts the encrypted data from the buffer. The program code decrypts the encrypted data, with the new key.

In some embodiments of the present invention, the computing resource in the secure environment comprises a beacon with a pre-defined communications range. The pre-defined communications range may be within geographical boundaries of the secure environment.

In some embodiments of the present invention, the buffer accessible to the client comprises a portable storage device.

In some embodiments of the present invention, the program code stores the key on the client. The program code re-establishes a communications connection to the computing resource in the secure environment. Based on re-establishing the connection, the program code authenticates to the computing resource. Based on the authenticating, the program code decrypts the encrypted data, with the key.

In some embodiments of the present invention, the communications connection is terminated by one of the client or the computing resource after the authenticating, and the program code also requests a new connection to the computing resource, where based on the requesting a connection is established between the computing resource and the client or the connection is not established between the computing resource and the client. The program code requests access to the encrypted data on the buffer. Based on the connection being established between the computing resource and the client, responsive to the request, the program code obtains access to the encrypted data. Based on the connection not being established between the computing resource and the client, responsive to the request, the program code does not obtain access the encrypted data.

In some embodiments of the present invention, the program code obtaining access to the encrypted data comprises: the program code automatically, decrypting the encrypted data, with the key.

In some embodiments of the present invention, the connection is not established based on the one or more processors being outside of the geographical boundaries of the secure environment.

In some embodiments of the present invention, the pre-defined communications range is within geographical boundaries of the secure environment, the method further comprises: the program code accessing the encrypted data on the buffer, the accessing comprising: the program code re-establishing the communications connection to the computing resource in the secure environment. Based on re-establishing the connection, the program code authenticates to the computing resource, where the authenticating comprises the program code obtaining a new key. The program code intercepts the encrypted data from the buffer. The program code determines if the one or more processors are within the secure computing environment. Based on determining that the one or more processors are within the secure computing environment, the program code decrypts the encrypted data, with the new key.

Figure 6:
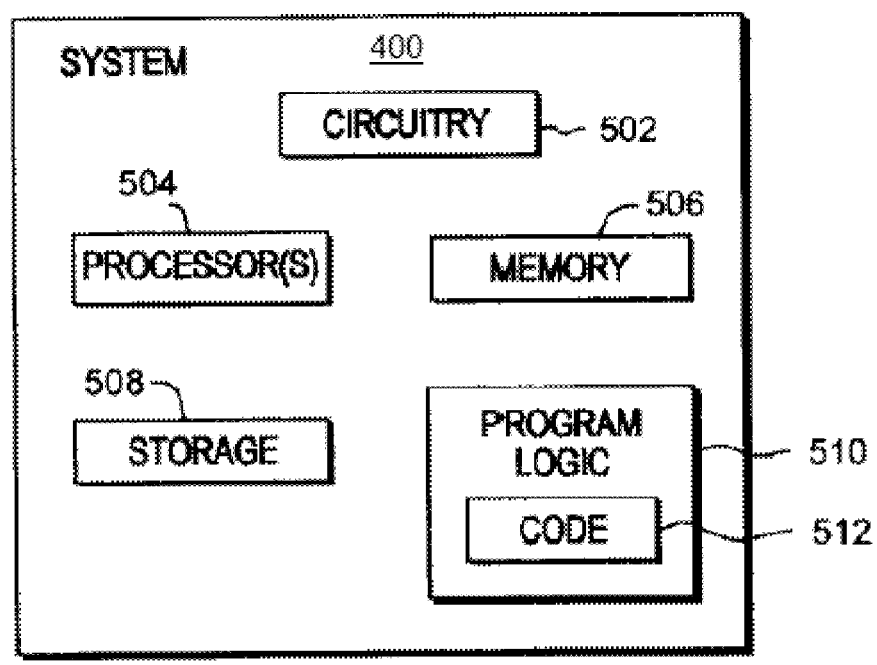
FIG. 6 depicts a computer system configured to perform an aspect of an embodiment of the present invention.

In some embodiments of the present invention, the pre-defined communications range is within geographical boundaries of the secure environment, and the program code also authenticates to the computing resource by determining that client is within the secure computing environment FIG. 6 illustrates a block diagram of a resource 400 in computer system, such as, which is part of the technical architecture of certain embodiments of the technique. Returning to FIG. 6, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 6 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 7:
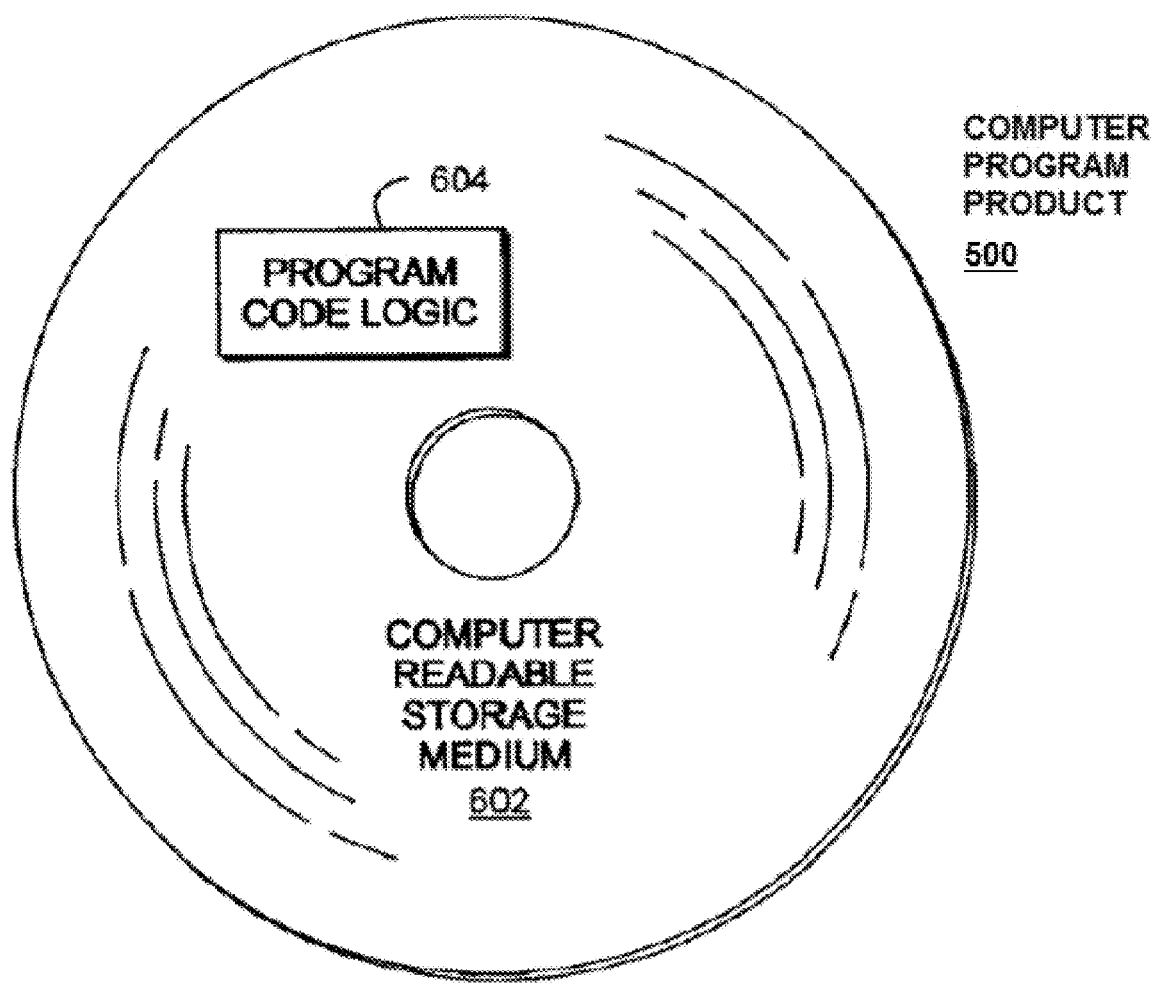
FIG. 7 depicts a computer program product incorporating one or more aspects of the present invention.

Using the processing resources of a resource 400 to execute software, computer-readable code or instructions, does not limit where this code can be stored. Referring to FIG. 7, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
obtaining, by one or more processors of a client, from a host within a secure environment, wherein the secure environment is a spatially defined area within geographical boundaries, data stored on the host, wherein the obtaining comprises:
  establishing, by one or more processors, a communications connection to a computing resource in the secure environment, wherein the computing resource in the secure environment comprises a stationary beacon with a pre-defined communications range, wherein the pre-defined communications range comprises the geographical boundaries of the secure environment;
  based on establishing the connection, authenticating, by the one or more processors, to the computing resource, wherein the authenticating comprises obtaining a key, wherein the computing resource is stationary and can authenticate only within the pre-defined communication range;
  intercepting, by the one or more processors, the data;
  encrypting, by the one or more processors, the data, with the key; and
  storing, by the one or more processors, based on the authenticating, the encrypted data on a buffer accessible to the client.

2. The computer-implemented method of claim 1, wherein the communications connection is terminated by the client or by the computing resource after the authenticating, and wherein the computing node is selected from the group consisting of: a static computing node and a dynamic computing node.

3. The computer-implemented method of claim 2, further comprising:
  accessing, by the one or more processors, the encrypted data on the buffer, the accessing comprising:
    re-establishing, by the one or more processors, the communications connection to the computing resource in the secure environment;
    based on re-establishing the connection, authenticating, by the one or more processors, to the computing resource, wherein the authenticating comprises obtaining a new key;
    intercepting, by the one or more processors, the encrypted data from the buffer; and
    decrypting, by the one or more processors, the encrypted data, with the new key.

4. The computer-implemented method of claim 1, wherein the buffer accessible to the client comprises a portable storage device.

5. The computer-implemented method of claim 2, further comprising:
  storing, by the one or more processors, the key on the client;
  re-establishing, by the one or more processors, the communications connection to the computing resource in the secure environment;
  based on re-establishing the connection, authenticating, by the one or more processors, to the computing resource; and
  based on the authenticating, decrypting, by the one or more processors, the encrypted data, with the key.

6. The computer-implemented method of claim 1, wherein the communications connection is terminated by one of the client or the computing resource after the authenticating, the method further comprising:
  requesting, by the one or more processors, a new connection to the computing resource, wherein based on the requesting a connection is established between the computing resource and the client or the connection is not established between the computing resource and the client;
  requesting, by the one or more processors, access to the encrypted data on the buffer;
  based on the connection being established between the computing resource and the client, responsive to the request, obtaining access to the encrypted data; and
  based on the connection not being established between the computing resource and the client, responsive to the request, not obtaining access the encrypted data.

7. The computer-implemented method of claim 6, wherein obtaining access to the encrypted data comprises:
  automatically, decrypting, by the one or more processors, the encrypted data, with the key.

8. The computer-implemented method of claim 7, wherein the connection is not established based on the one or more processors being outside of the geographical boundaries of the secure environment.

9. The computer-implemented method of claim 2, the method further comprising:
  accessing, by the one or more processors, the encrypted data on the buffer, the accessing comprising:
    re-establishing, by the one or more processors, the communications connection to the computing resource in the secure environment;
    based on re-establishing the connection, authenticating, by the one or more processors, to the computing resource, wherein the authenticating comprises obtaining a new key;
    intercepting, by the one or more processors, the encrypted data from the buffer;
    determining, by the one or more processors, if the one or more processors are within the secure computing environment; and
    based on determining that the one or more processors are within the secure computing environment, decrypting, by the one or more processors, the encrypted data, with the new key.

10. The computer-implemented method of claim 1, the method further comprising: authenticating, by the one or more processors, to the computing resource, wherein the authenticating further comprises: determining, by the one or more processors, that client is within the secure computing environment.

11. A system comprising:
  a memory;
  one or more processors in communication with the memory;
  program instructions executable by the one or more processors via the memory to perform a method, the method comprising:
    obtaining, by the one or more processors, wherein a client comprises the one or more processors, from a host within a secure environment, wherein the secure environment is a spatially defined area within geographical boundaries, data stored on the host, wherein the obtaining comprises:
      establishing, by one or more processors, a communications connection to a computing resource in the secure environment, wherein the computing resource in the secure environment comprises a beacon with a pre-defined communications range, wherein the pre-defined communications range comprises the geographical boundaries of the secure environment;

based on establishing the connection, authenticating, by the one or more processors, to the computing resource, wherein the authenticating comprises obtaining a key, wherein the computing resource is stationary and can authenticate only within the pre-defined communication range;

intercepting, by the one or more processors, the data;

encrypting, by the one or more processors, the data, with the key; and storing, by the one or more processors, based on the authenticating, the encrypted data on a buffer accessible to the client.

12. The system of claim 11, wherein the communications connection is terminated by the client or by the computing resource after the authenticating.

13. The system of claim 12, further comprising:

accessing, by the one or more processors, the encrypted data on the buffer, the accessing comprising:

re-establishing, by the one or more processors, the communications connection to the computing resource in the secure environment;

based on re-establishing the connection, authenticating, by the one or more processors, to the computing resource, wherein the authenticating comprises obtaining a new key;

intercepting, by the one or more processors, the encrypted data from the buffer; and decrypting, by the one or more processors, the encrypted data, with the new key.

14. The system of claim 12, the method further comprising:

storing, by the one or more processors, the key on the client;

re-establishing, by the one or more processors, the communications connection to the computing resource in the secure environment;

based on re-establishing the connection, authenticating, by the one or more processors, to the computing resource; and based on the authenticating, decrypting, by the one or more processors, the encrypted data, with the key.

15. A computer program product comprising:

a non-transitory computer readable storage medium readable by one or more processors and storing instructions for execution by the one or more processors for performing a method comprising:

obtaining, by the one or more processors, wherein a client comprises the one or more processors, from a host within a secure environment, wherein the secure environment is a spatially defined area within geographical boundaries, data stored on the host, wherein the obtaining comprises:

establishing, by one or more processors, a communications connection to a computing resource in the secure environment, wherein the computing resource in the secure environment comprises a beacon with a pre-defined communications range, wherein the pre-defined communications range comprises the geographical boundaries of the secure environment;

based on establishing the connection, authenticating, by the one or more processors, to the computing resource, wherein the authenticating comprises obtaining a key, wherein the computing resource is stationary and can authenticate only within the pre-defined communication range;

intercepting, by the one or more processors, the data;

encrypting, by the one or more processors, the data, with the key; and storing, by the one or more processors, based on the authenticating, the encrypted data on a buffer accessible to the client.

16. The computer program product of claim 15, wherein the communications connection is terminated by the client or by the computing resource after the authenticating, the method further comprising:

accessing, by the one or more processors, the encrypted data on the buffer, the accessing comprising:

re-establishing, by the one or more processors, the communications connection to the computing resource in the secure environment;

based on re-establishing the connection, authenticating, by one or more processors, to the computing resource, wherein the authenticating comprises obtaining a new key;

intercepting, by the one or more processors, the encrypted data from the buffer; and decrypting, by the one or more processors, the encrypted data, with the new key.

* * * * *